United States Patent [19]

Lewitt

[11] Patent Number: 4,948,059
[45] Date of Patent: Aug. 14, 1990

[54] TENSIONING DEVICE FOR A FISHING LINE

[76] Inventor: Laurence G. Lewitt, 69 The Circle, Glen Head, N.Y. 11545

[21] Appl. No.: 430,280

[22] Filed: Nov. 2, 1989

[51] Int. Cl.⁵ ............... B65H 59/04; B65H 49/20
[52] U.S. Cl. ........................... 242/156; 242/106; 242/129.6; 242/129.8
[58] Field of Search ........... 242/156, 129.6, 129.8, 242/129.5, 106, 47, 50, 53, 75.4, 55.2, 61, 129.51, 68, 68.4

[56] References Cited

U.S. PATENT DOCUMENTS

| | | | |
|---|---|---|---|
| 112,656 | 3/1871 | Vincent | 242/106 X |
| 693,849 | 2/1902 | Ernst | 242/156 X |
| 1,486,406 | 3/1924 | Wilson | 242/129.6 |
| 3,295,787 | 1/1967 | Golanka | 242/129.8 |
| 3,685,761 | 8/1972 | Zelinski | 242/106 X |
| 3,973,741 | 8/1976 | Dean | 242/106 |
| 3,998,402 | 12/1976 | Christensen et al. | 242/106 |
| 4,360,172 | 11/1982 | Cope | 242/129.8 |
| 4,776,527 | 10/1988 | Prowant | 242/106 |

*Primary Examiner*—Stanley N. Gilreath
*Attorney, Agent, or Firm*—Michael I. Kroll

[57] ABSTRACT

A tensioning device for a fishing line is provided and consists of a base member secured to a stationary structure. The base member has two outwardly extending arms, one of which is adjustable toward and away from the other. A take off spool of bulk fishing line is rotatably supported between the arms of the base member. Resistance to the take off spool is applied during rotation to keep the fishing line under tension when transferred onto a fishing reel by one person.

8 Claims, 2 Drawing Sheets

4,948,059

TENSIONING DEVICE FOR A FISHING LINE

BACKGROUND OF THE INVENTION

1. Field of the Invention

The instant invention relates generally to holding fixtures and more specifically it relates to a tensioning device for a fishing line.

2. Description of the Prior Art

Numerous holding fixtures have been provided in prior art that are adapted to rotatably support various items such as spools of thread, spools of fishing lines and paper rolls. While these units may be suitable for the particular purpose to which they address, they would not be as suitable for the purposes of the present invention as heretofore described.

SUMMARY OF THE INVENTION

A primary object of the present invention is to provide a tensioning device for a fishing line that will overcome the shortcomings of the prior art devices.

Another object is to provide a tensioning device for a fishing line that will keep the line under tension when it is transferred onto a fishing reel so that the fishing reel will have a neat, taut, tightly drawn line that will not tangle when eventually used.

An additional object is to provide a tensioning device for a fishing line that can be mounted on a boat deck, bulkhead or put in a vice so that one person can perform the operation of putting the fishing line under tension from a take off spool onto a fishing reel.

A further object is to provide a tensioning device for a fishing line that is simple and easy to use.

A still further object is to provide a tensioning device for a fishing line that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
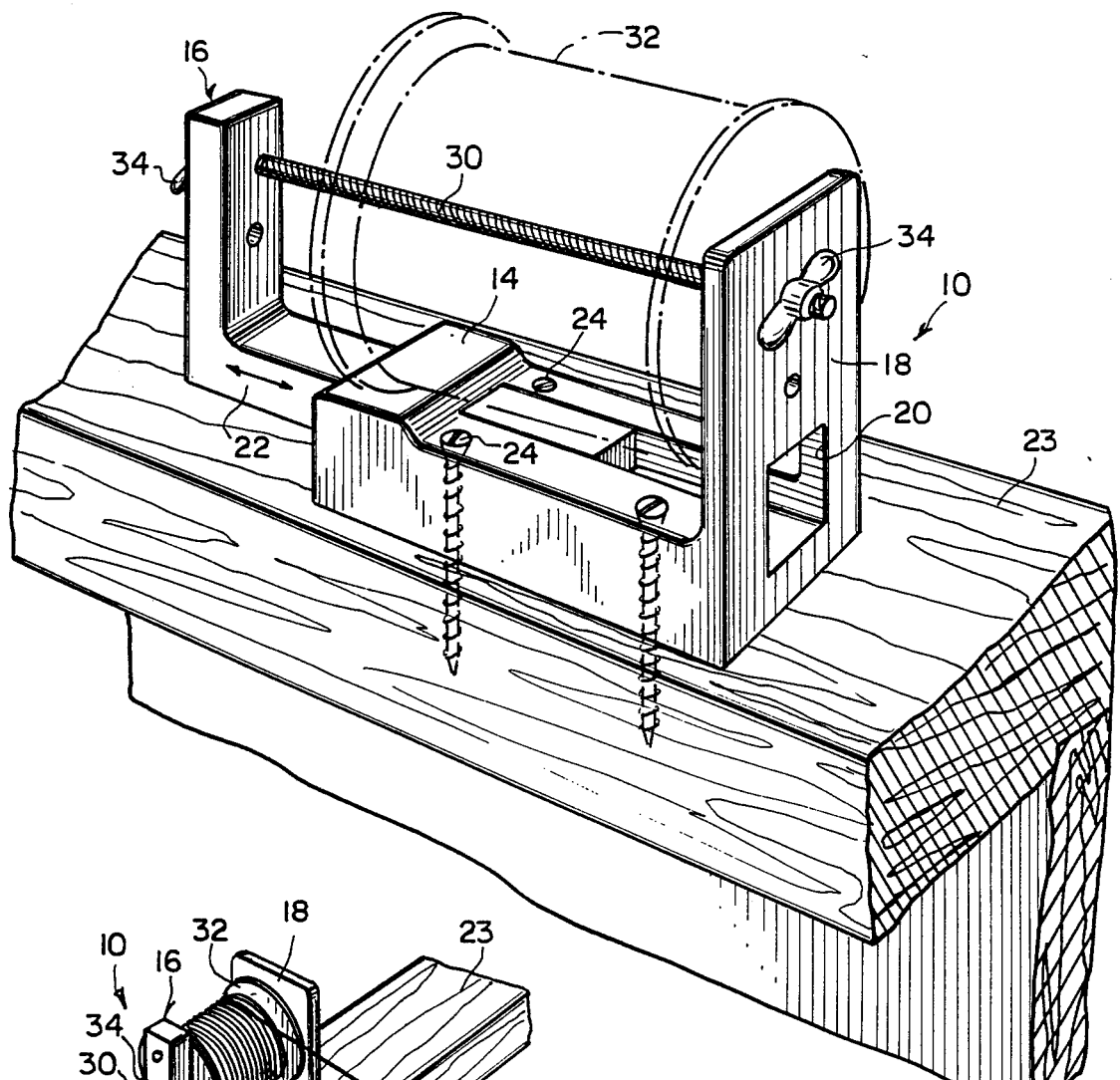
FIG. 1 is a perspective view of the invention mounted with screws onto a boat deck.
Figure 2:
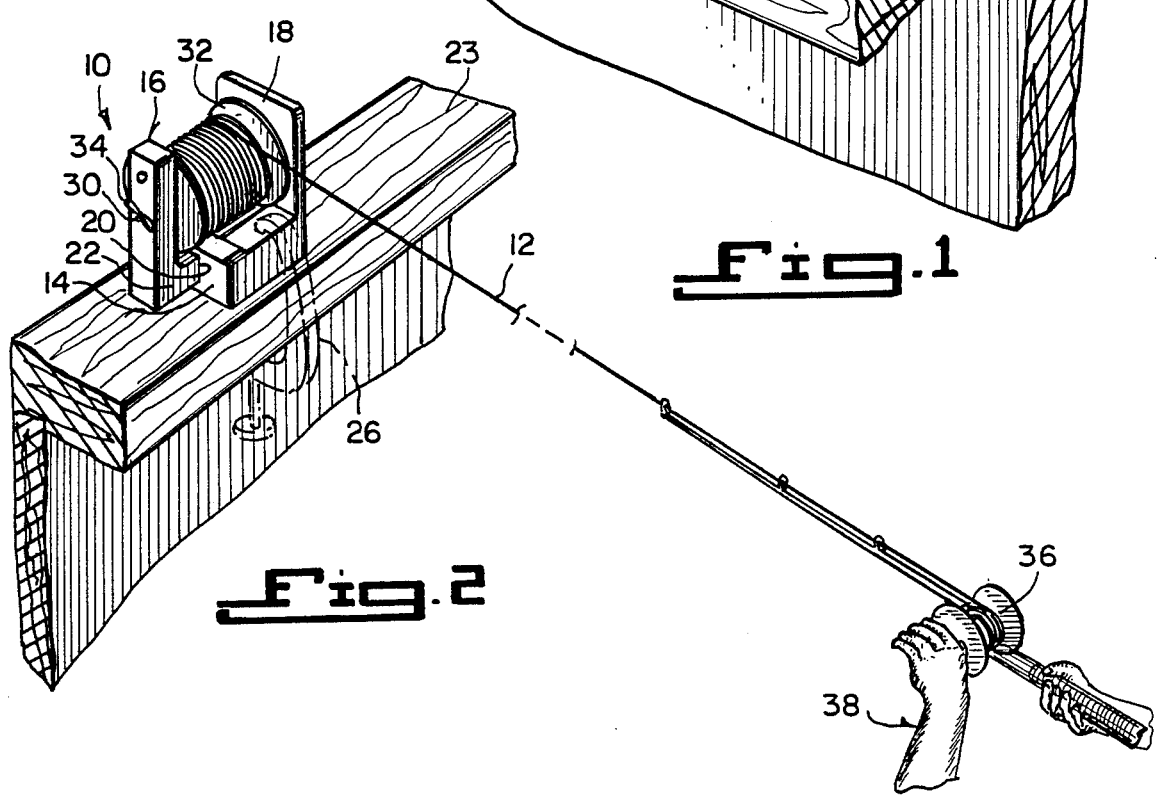
FIG. 2 is a perspective view of the invention mounted with a clamp onto the boat deck and showing the fishing line under tension being transferred to a fishing reel.
Figure 3:
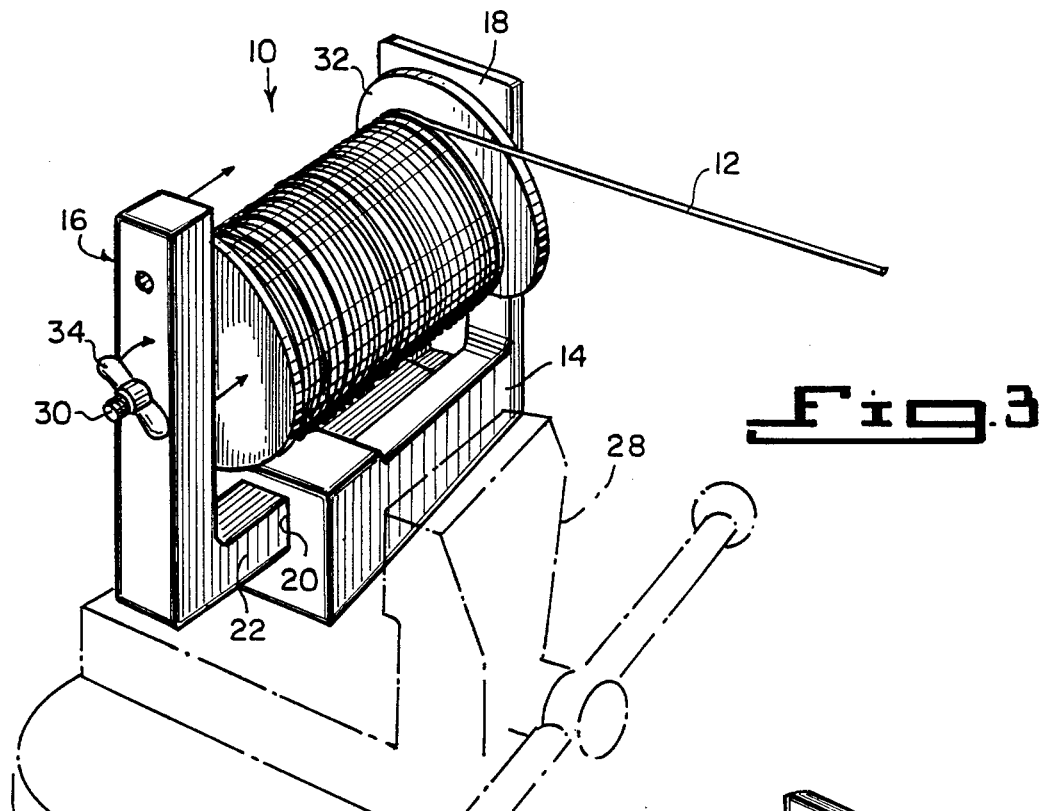
FIG. 3 is a perspective view of the invention placed into a vice.

Turning now descriptively to the drawings, in which similar reference characters denote similar elements throughout the several views, FIG. 1 through 3 illustrate a tensioning device 10 for a fishing line 12. The device 10 consists of a base member 14 having two outwardly extending arms 16 and 18 in which arm 16 is adjustable toward and away from the other arm 18. The base member 14 further includes a slot 20 extending therethrough and the adjustable arm 16 is L-shaped so that one leg 22 can travel within the slot 20.

The base member 14 can be secured to a stationary structure, such as a boat deck 23 by either a plurality of screws 24, a C-clamp 26 or a vise 28. An elongated threaded shaft 30 extends between the arms 16 and 18 of the base member 14 for rotatably supporting a take off spool 32 of bulk fishing line 12. A wing nut 34 is threaded onto each end of the threaded shaft 30 so that when tightened the adjustable arm 16 of the base member 14 will bear against one side of the take off spool 32 to apply resistance thereto during rotation of the take off spool. This keeps the fishing line 12 under tension when transferred onto a fishing reel 36 by one person 38 so that the fishing reel 36 will have a neat, taut, tightly drawn fishing line 12 that will not tangle when eventually used.

Figure 4:
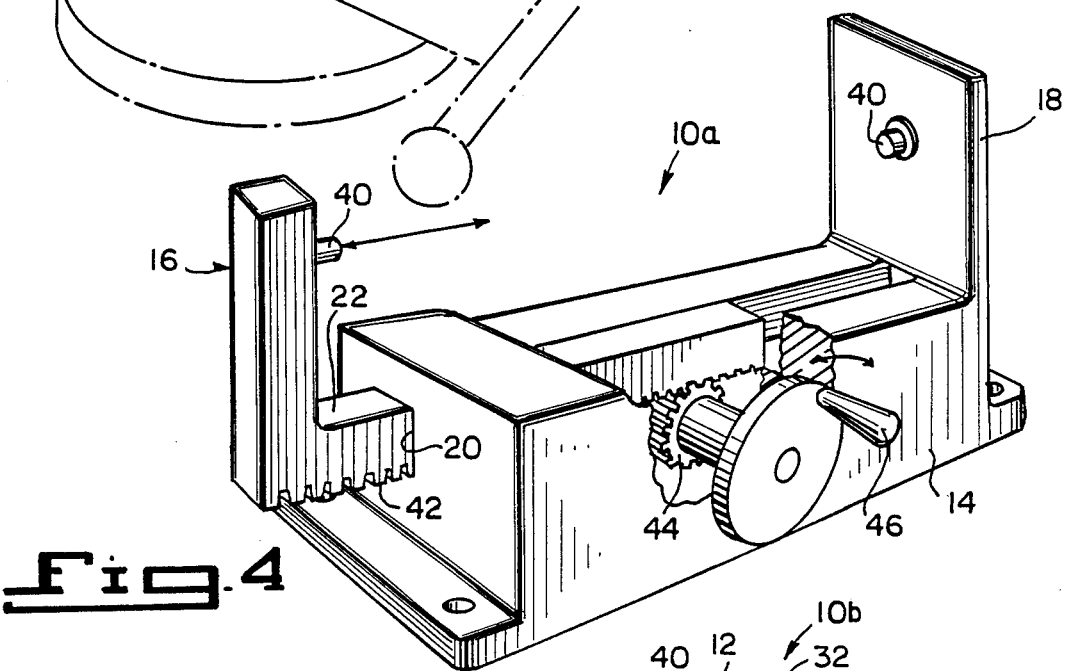
FIG. 4 is a perspective view with parts broken away of a first modification of the invention in which tension to the take off spool is provided by a rack and pinion gear.
Figure 5:
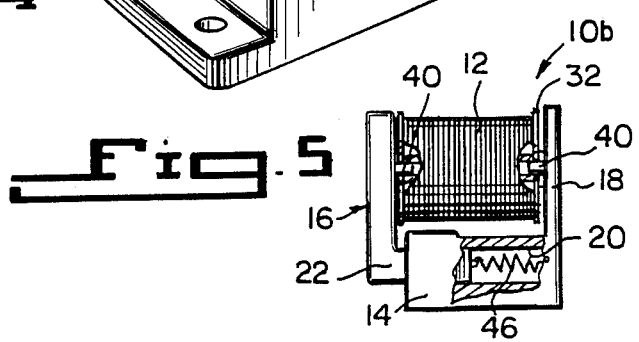
FIG. 5 is a front view with parts broken away of a second modification of the invention in which tension to the take off spool is provided by a spring.

FIGS. 4 and 5 shows modified tensioning devices 10a and 10b that include a pair of pin shafts 40, each extending inwardly from one of the arms 16, 18 in the base member 14 to cooperate with the take off spool 32 and allow rotatable support.

In FIG. 4 a rack 42 is formed on leg 22 of the L-shaped adjustable arm 16 that travels within the slot 20 in the base member 14. A pinion gear 44 is rotatably carried within the base member 14 to engage with the rack 42. A crank handle 46 is connected to the pinion gear 44 so that when the crank handle 46 is rotated in one direction the adjustable arm 16 of the base member 14 will bear against one side of the take off spool 32 to apply resistance thereto during rotation of the take off spool.

In FIG. 5 a tension spring 46 extends between the leg 22 of the L-shaped adjustable arm 16 that travels within the slot 20 in the base member 14 and the base member causing the adjustable arm 16 of the base member 14 to bear against one side of the take off spool 32 to apply resistance thereto during rotation of the take off spool.

It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A tensioning device for a fishing line, comprising:

(a) a base member having two outwardly extending arms, one of which is adjustable toward and away from the other, said base member further containing a slot extending therethrough and said adjustable arm being "L"-shaped so that one leg can travel within said slot;

(b) means for securing said base member to a stationary structure;

(c) means for rotatably supporting a take off spool of bulk fishing line between said arms of said base member; and (d) means for applying resistance to the take off spool during rotation to keep the fishing line under tension when transferred onto a fishing reel by one person, so that the fishing reel will have a neat, taut, tightly drawn fishing line that will not tangle when eventually used.

2. A tensioning device as recited in claim 1, wherein said securing means includes a plurality of screws extending through said base member into the stationary structure.

3. A tensioning device as recited in claim 1, wherein said securing means is a C-clamp to hold said base member to the stationary structure.

4. A tensioning device as recited in claim 1, wherein said securing means is a vise to hold said base member to the stationary structure.

5. A tensioning device as recited in claim 1, further comprising:

(a) said rotatably supporting means being a elongated threaded shaft extending between said arms of said base member; and (b) said rotation resistance means being at least one wing nut threaded onto end of said threaded shaft so that when tightened said adjustable arm of said base member will bear against one side of the take off spool to apply resistance thereto.

6. A tensioning device as recited in claim 1, wherein said rotatably supporting means includes a pair of pin shafts, each extending inwardly from one of said arms in said base member to cooperate with the take off spool.

7. A tensioning device as recited in claim 6, wherein said rotation resistance means includes:

(a) a rack formed on said leg of said L-shaped adjustable arm that travels within said slot in said base member;

(b) a pinion gear rotatably carried within said base member to engage with said rack; and (c) a crank handle connected to said pinion gear so that when said crank handle is rotated in one direction said adjustable arm of said base member will bear against one side of the take off spool to apply resistance thereto.

8. A tensioning device as recited in claim 6, wherein said rotation resistance means includes a tension spring extending between said leg of said L-shaped adjustable arm that travels within said slot in said base member and said base member causing said adjustable arm of said base member to bear against one side of the take off spool to apply resistance thereto.

* * * * *